Oct. 17, 1933.                H. B. HITZ                1,931,438
                           ANTIGLARE DEVICE
                          Filed May 7, 1931           2 Sheets-Sheet 1
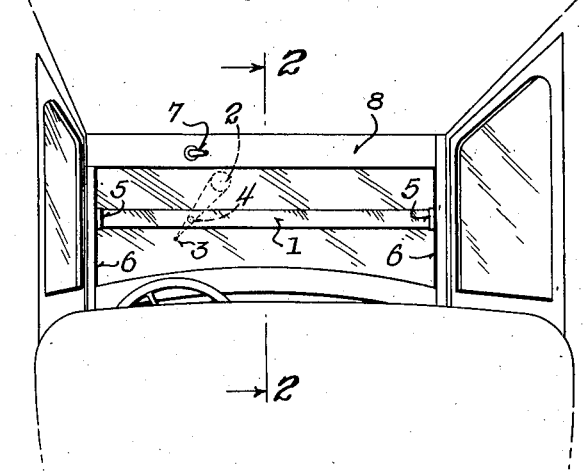
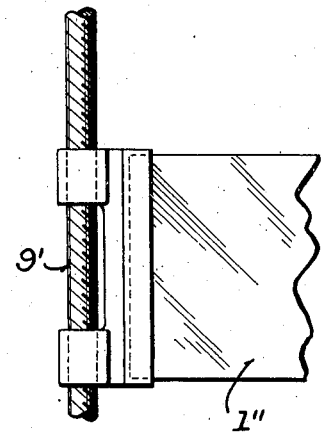
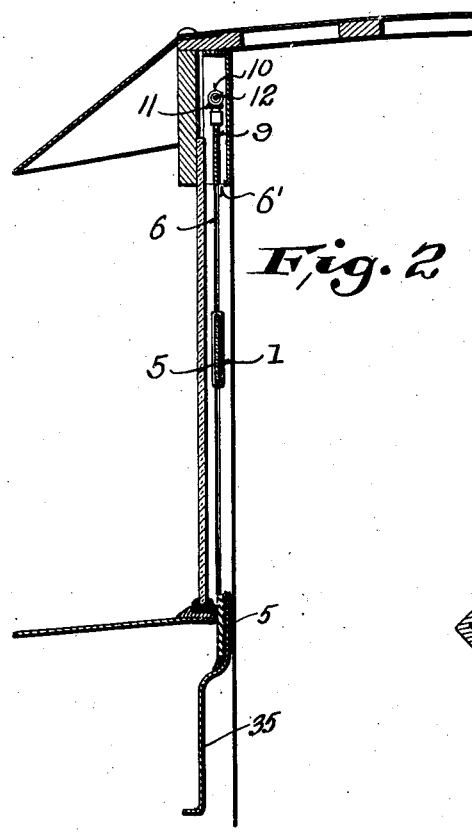
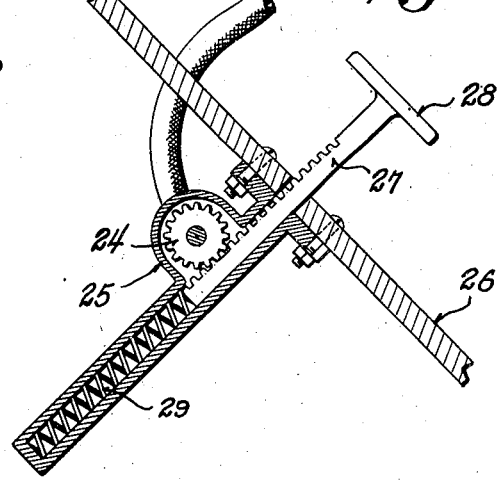
INVENTOR
Henry B. Hitz
BY
Peter C. McNulty
ATTORNEY Patented Oct. 17, 1933

1,931,438

UNITED STATES PATENT OFFICE

1,931,438

ANTIGLARE DEVICE

Henry B. Hitz, Nashota, Wis., assignor of one-half to Elizabeth A. Conover, Easton, Pa.

Application May 7, 1931. Serial No. 535,689

9 Claims. (Cl. 296—97)

The invention relates to anti-glare devices.

The cause of much discomfort and hazard in the driving of a motor vehicle is the condition commonly known as "glare". Glare may be caused in daylight by the sun, when it is near the horizon, and at night by brightly illuminated and poorly adjusted lights on approaching vehicles. It is the purpose of this invention to combat and reduce glare while involving a minimum of obstruction of normal vision. A further purpose of this invention is to provide a device which can be incorporated in the construction of a motor vehicle without detracting from the good appearance of the same and which can be concealed when not in use and instantly brought into functioning position with a minimum of effort on the part of the driver when desired.

In the practice of my profession as a physician specializing in matters concerning eyesight, I have observed many attempts to solve the problem of improving visibility under trying conditions. Many of these attempts have been concerned with the problem of improving the visibility of the motor vehicle driver when he is confronted with the condition known as "glare". None of these attempts have, I believe, produced a result which is entirely satisfactory prior to this invention.

This invention makes use of the fact that the source of glare under nearly every condition is emitted by a luminous object which subtends only a very small angle at the driver's eye. In other words, only a very small portion of the driver's total field of vision is excessively illuminated. For example, an approaching vehicle, when at a distance of fifty yards, subtends an angle of approximately two and one-half degrees and the lights of the approaching vehicle themselves a vertical angle of approximately one-half of one degree. This situation permits the prevention of glare when proper means are employed without materially obstructing the driver's vision. This invention provides means for reducing the intensity of the illumination reaching the driver's eyes in certain definite and limited portions of the field of vision corresponding to the glaring source.

The condition known as glare is not only due to such excesses of illumination as are uncomfortable and destructive to the eye, but also due to blinding. Blinding results when a portion of the field of vision is illuminated much more brilliantly than another portion, whether brilliantly enough to cause discomfort or not. The human eye is sensitive to a range of intensity of illumination of several thousandfold. This great adaptability of the eye, however, is brought about in a great part by its intensity accommodation mechanism. This accommodation mechanism naturaly adapts itself to comfortably receive the most strongly illuminated portions of the field of vision. The eye cannot accommodate itself to view a poorly illuminated object standing near to a brightly illuminated object and the poorly illuminated object becomes invisible whenever the ratio of the two illuminations exceeds a certain definite value. Means have been devised for combating glare which consists in filters or dark, transparent screens which reduce to a comfortable value the illumination reaching the driver's eye from a source of glare. These filters are relatively large and are so arranged that illumination from practically the entire field of vision is reduced proportionately. The glaring portions of the field are reduced to a reasonable brightness, but the poorly illuminated portions are practically obscured. These means, to express it more exactly, do not remove the cause of "blinding", because the ratio of illumination between brightly illuminated and poorly illuminated objects remains unaltered and blinding still occurs.

In this invention a sufficiently small filter or dark, transparent screen is arranged to be easily adjustable so that light from the glaring source passes through the filter in reaching the driver's eyes and the remainder of the field of vision is substantially unobstructed by the filter. It has been explained above that under most conditions the source of glare subtends only a small angle and for this reason the screen need only be of limited size, providing the screen is sufficiently mobile to allow the driver to instantly bring it to and maintain it in the desired position. The main portion of the driver's field of vision is not obscured by the filter and by selecting a filter of the proper density blinding is eliminated because the apparent variation of illumination in the driver's entire field of vision is brought within the accommodation of the eye.

In explaining the invention reference is had to the drawings in which

Fig. 1 is a perspective view of the interior of a motor vehicle to which the invention has been attached;

Fig. 2 is a section taken at 2—2 in Fig. 1;

Fig. 5 is a view of a foot-controlled form of the invention, parts being broken away.

Figure 3:
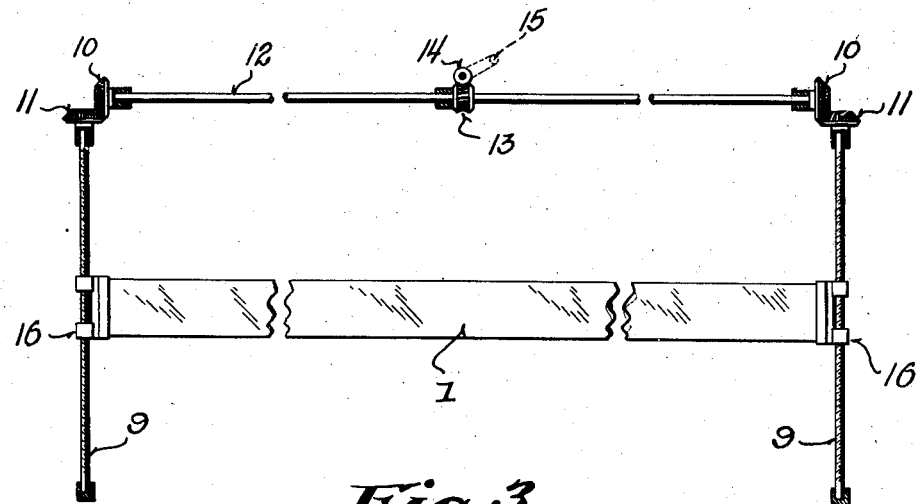
Fig. 3 is a diagrammatic assembly of one form of the moving parts of the invention.

In Fig. 1 the screen is indicated at 1. The screen comprises a narrow strip of dark, transparent material which will transmit only a small fraction of the light which falls upon it. The material of the strip may be what is known as dark amber glass or any dark-colored glass or other dark-colored transparent material. This strip is made of sufficient width so that the source of illumination 2, for example, the sun or the lights of an approaching vehicle, will cause a projection with respect to the driver's eye 3 entirely within the screen, as indicated at 4. The screen is, however, narrow enough so that it only occupies a small fraction of the total field of vision. At both ends of the screen 1 are clamping members 5, which travel in guideways 6 and are moved therein by a crank 7 and connecting linkage, not shown in Fig. 1 but shown in detail in Fig. 3. The screen may be moved by means of crank 7 over the entire width of the windshield and when not in use may be drawn up out of sight behind coping 8.

A very desirable feature of this invention is the ease with which it may be concealed when not in use. The small size of the screen makes it possible to completely shield the device with coping 8, which is no wider than is normally used in closed motor vehicle construction. At times it may be expedient to conceal the screen in the cowl 35 of the vehicle and this is contemplated where conditions demand it. The operation mechanism in this case is simply inverted, the screen being slightly curved to conform with the shape of the cowl.

In Fig. 2 a section of the device is shown indicating the manner of placing the guideways 6 in the corner-posts of the motor vehicle and the placing therein of vertical adjusting screws 9 upon the upper ends of which are bevel gears 11 which mesh with bevel gears 10. A bevel gear 10 is secured to each end of horizontal rod 12. Intermediately placed on horizontal rod 12 is a worm-gear 13. A pinion worm 14 rotatably secured to the body of the motor vehicle meshes with the worm-gear 13. The pinion worm 14 engages with a crank 7 to rotate therewith. Upon the vertical adjusting screws 9, guide-clamps 16 are placed in threaded engagement therewith. The guide-clamps 16 are secured to the dark, transparent screen 1 so that when crank 15 is turned, the vertical adjusting screws 9 are rotated and vertical translatory motion is communicated to the dark, transparent screen 1.

The above-described mechanism is more clearly shown in skeleton form in Fig. 3 in which the screen 1, guide-clamps 16 and vertical adjusting screws 9 are shown in functioning relation. The bevel gears 10 and 11 coacting with the vertical adjusting screws 9 are shown. The horizontal rod 12 and the actuating mechanism represented by worm-gear 13, bevel worm 14 and crank shaft 15 are shown in proper position between the gears 10 and 10.

Figure 4:
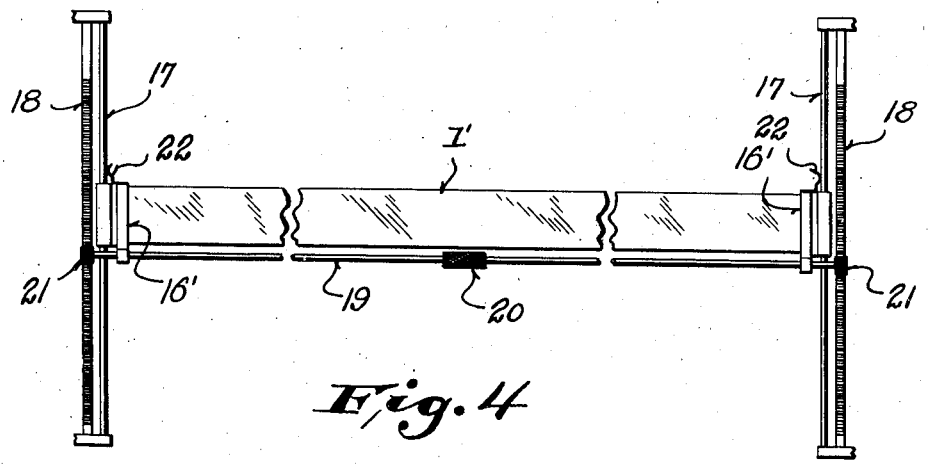
Fig. 4 is another assembly of the moving parts of an embodiment of the invention.

An optional form of construction is represented in Fig. 4 and in certain cases this type of construction is preferable. In this form of the device screen 1' is carried in guide-clamps 16' moving upon guide rods 17. The guide rods 17 are secured to the corner posts of the motor vehicle. Adjacent the guide rods 17 are pinion racks 18, likewise secured to the corner-posts of the motor vehicle. The actuating rod 19 is rotatably secured in guide-clamps 16'. At a convenient intermediate point on actuating rod 19 is placed a knurled actuating sleeve 20. Near each end of the actuating rod 19 are secured pinions 21 which rotate therewith. Pinions 21 engage pinion racks 18 so that when the knurled sleeve 20 is rotated vertical translatory motion is communicated to the dark screen 1'. Friction brakes 22 are secured to the guide-clamps 16' to maintain a given adjustment.

A more convenient and at times preferable embodiment of this invention is shown in Fig. 5. This form of device is similar to the form shown in Fig. 3 with the exception that actuating parts 13, 14 and 15 are dispensed with and replaced by flexible actuating cable 23 secured to the lower extremity of one of the vertical adjusting screws 9'. The other end of the flexible cable 23 is positioned under the floor-board 26 of the motor vehicle in close proximity to the driver's left foot when in normal driving position. This end of the flexible actuating cable 23 is secured to rotate with a pinion 24 rotatably mounted in a pedal casing 25 which is secured to the floor-board 26. Slidably mounted in the pedal casing 25 is a pedal rack 27 which coactively meshes with pinion gear 24. Secured to pedal rack 27 is a pedal 28 upon which the driver may place his foot and cause the pedal rack 27 to be depressed, rotating pinion gear 24, flexible shaft 23 and vertical adjusting screws 9', thereby producing a vertical, translatory motion in the dark screen 1''. The diameter of pinion gear 24 and the length of pedal rack 27 are so adjusted that the screen 1'' can be moved the full width of the windshield. Placed in the pedal casing 25 is a compression spring 29 which urges the pedal rack 27 upward when the foot pressure is released from pedal 28 and by the urging of the spring causes the dark screen 1'' to return to its non-functioning position, preferably behind a coping, such as shown at 8 in Fig. 1.

The form of device described immediately above and shown in Fig. 5 makes it possible to place the actuating means in any convenient position in the vehicle so that the screen may be moved as desired in any manner preferred by the driver.

In the claims hereinafter the term "light filter" is used to describe any material in the form of a sheet or plate which is transparent, but which only transmits a small portion of the light which falls upon it.

While I have fully described several embodiments of my invention and have shown that if sufficient adjustability and control of the screen is provided that a screen small enough to produce an entirely new result in preventing glare can be constructed, I do not wish to be narrowly bound to the particular details of construction above described, but wish only to be limited to the true scope of my invention as represented by the appended claims.

What I claim as my invention is:

1. In combination with a windshield having a frame consisting of side members and a top member; said top member having a deep pocket in its lower edge receiving the upper end of the windshield when the latter is raised; an anti-glare shield movably mounted in guides in the side frames and adapted to be raised into the pocket and lowered across the upper portion of the windshield; and means for moving the anti-glare shield.

2. In a combination as set forth in claim 1, said guides in the side members extending into the pocket whereby the anti-glare shield may be raised out of view.

3. An anti-glare device for motor vehicles having a windshield movably mounted in guides in the windshield frame and having a pocket in the frame receiving the windshield when moved into one position; a rigid light filter adapted to be mounted adjacent the windshield for occupying a limited portion of the vehicle driver's field of vision and adapted to be concealed in the pocket when not in use, and means adapted to be housed in the guides cooperable with said light filter for adjustably maintaining said light filter in a plurality of predetermined positions.

4. In a device as set forth in claim 3, clamps secured to said filter; and said adjusting means comprising screws rotatably mounted in said guides in threaded engagement with said clamps, and means for rotating the screws.

5. An anti-glare device for motor vehicles having a windshield movably mounted in guides in the windshield frame and having a pocket in the frame receiving the windshield when moved into one position, a rigid light filter adapted to be mounted adjacent the windshield for occupying a limited portion of the vehicle driver's field of vision and adapted to be concealed in the pocket when not in use, and means adapted to be placed in the guides cooperable with said light filter for adjustably maintaining said light filter in a plurality of predetermined positions; and means operable by the driver's foot for operating the adjusting means.

6. In a device as set forth in claim 5, clamps secured to the ends of the filter; and said adjusting means comprising screws rotatably mounted in said guides in threaded engagement with said clamps; and said operating means comprising a flexible shaft connected with a screw; a rack operable by the driver's foot; a pinion on said shaft engaging the rack; and means for yieldably maintaining the rack in one position.

7. In combination with a windshield having a frame consisting of side members, a top member, and a cowl forming the bottom member, the bottom member having a pocket in its lower edge; an anti-glare shield movably mounted in guides in the side members and adapted to be lowered into the pocket in the bottom member and to be raised across the windshield; and means for moving the anti-glare shield.

8. In a combination as set forth in claim 7, said guides in the side members extending into the pocket whereby the glare shield may be lowered out of view when not in use.

9. In a combination as set forth in claim 7, clamps secured to said shield; and said moving means comprising adjusting screws mounted in the guides in said side members and having threaded engagement with said clamps, and means for rotating the screws.

HENRY B. HITZ.